United States Patent [19]

Santilli et al.

[11] Patent Number: 5,376,260
[45] Date of Patent: * Dec. 27, 1994

[54] PROCESS FOR PRODUCING HEAVY LUBRICATING OIL HAVING A LOW POUR POINT

[75] Inventors: Donald S. Santilli, Larkspur; Stacey I. Zones, San Francisco, both of Calif.

[73] Assignee: Chevron Research and Technology Company, San Francisco, Calif.

[*] Notice: The portion of the term of this patent subsequent to Feb. 1, 2011 has been disclaimed.

[21] Appl. No.: 43,105

[22] Filed: Apr. 5, 1993

[51] Int. Cl.$^5$ .......................... C10G 11/02; C07C 5/13
[52] U.S. Cl. .................................... 208/111; 585/739; 585/740; 208/27; 208/97; 208/120
[58] Field of Search .......................... 208/59, 111, 113; 585/739

[56] References Cited

U.S. PATENT DOCUMENTS

| | | | |
|---|---|---|---|
| 4,222,855 | 9/1980 | Pelrine et al. | 208/111 |
| 4,414,097 | 11/1983 | Chester et al. | 208/59 |
| 4,814,543 | 3/1989 | Chen et al. | 585/739 |
| 5,053,373 | 10/1981 | Zones | 502/65 |
| 5,252,527 | 10/1993 | Zones | 502/64 |
| 5,282,958 | 2/1994 | Santilli et al. | 208/111 |
| 5,300,210 | 4/1994 | Zones et al. | 208/111 |

Primary Examiner—Helane Myers
Attorney, Agent, or Firm—R. J. Sheridan; A. W. Klaassen

[57] ABSTRACT

Heavy waxy oil is dewaxed by a mild cracking and isomerization process using a catalyst comprising SSZ-32 and at least one Group VIII metal. The heavy oil contains naphthenic wax, which includes only a relatively small amount of normal alkanes. Naphthenic wax containing a minor amount of oil may also be dewaxed using the process.

30 Claims, No Drawings

PROCESS FOR PRODUCING HEAVY LUBRICATING OIL HAVING A LOW POUR POINT

TECHNICAL FIELD

This invention relates to a process for reducing the pour point of a waxy refinery stream using a medium pore aluminosilicate, SSZ-32.

BACKGROUND OF THE INVENTION

Recent advances in the development of catalysts used for catalytic dewaxing have made it possible to produce low pour point lubricating oil base stock from waxy feeds at high yield. Dewaxing is required when highly paraffinic oils are to be used in products which need to remain mobile at low temperatures, e.g., lubricating oils, heating oils and jet fuels. The straight chain normal and slightly branched paraffinic substituents which are present in oils of this kind are waxes which cause high pour points and high cloud points in the oils. In heavy oils, cyclic paraffins and aromatics having paraffinic side chains re also present as wax. If adequately low pour points are to be obtained, these waxes must be wholly or partly removed, or converted to non-waxy analogues. In the past, various solvent removal techniques such as propane dewaxing and MEK dewaxing were used, but these techniques are costly and time consuming.

Catalytic dewaxing has been used to overcome the deficiencies of commercial solvent wax removal processes. U.S. Pat. No. 4,222,855 issued Sept. 16, 1980, to Pelrine et al. describes a process for dewaxing a waxy hydrocarbon fraction boiling between 450° F. and 1050° F. (about 232°–566° C.) using ZSM-23 or ZSM-35. U.S. Pat. No. 4,414,097 issued Nov. 8, 1983, to Chester et al. discloses dewaxing hydrocrackate with ZSM-23, where the hydrocrackate is derived from hydrocracking a hydrocarbon feedstock boiling above 343° C. The zeolite used in the present process has essentially the same X-ray diffraction pattern as ZSM-23, described in U.S. Pat. No. 4,076,842. In the present invention the aluminum content is higher than previously described. The X-ray diffraction lines are quite broad due to the very small crystal size.

Catalytic dewaxing processes using conventional catalysts remove waxes by selectively cracking waxy components to produce lower molecular weight products, some of which may be removed by distillation. For example, waxy paraffins may be cracked to lighter n-paraffins, including butane, propane, ethane and methane, which do not contribute to the waxy nature of the oil. Because these lighter products are generally of lower value than the higher molecular weight materials, it would be desirable to limit the degree of cracking which takes place during a catalytic dewaxing process.

Recent advances in processes for reducing the pour and cloud points of refinery streams have provided medium pore molecular sieves for isomerization and hydroisomerzation of the paraffinic components in the refinery streams. Isomerization of wax, which converts wax to non-waxy components boiling in the same range as the wax, is preferred to the cracking reactions described above.

U.S. Pat. No. 4,734,539 discloses a method for isomerizing a naphtha feed using an intermediate pore size zeolite catalyst, such as an H-offretite catalyst. U.S. Pat. No. 4,518,485 discloses a process for dewaxing a hydrocarbon feedstock containing paraffins by a hydrotreating and isomerization process.

In U.S. Pat. No. 4,814,543 issued Mar. 21, 1989, Chen et al. teaches paraffin isomerization of a 330°–650° F. (about 166°–343° C.) boiling range feedstock having a paraffinic content with not more than 20 carbon atoms and containing at least 20 ppm nitrogen impurities. ZSM-22, ZSM-23 or ZSM-35 are suggested as alternative hydroisomerization catalysts for this application. These catalysts are taught as being resistant to nitrogen poisoning under isomerization conditions in the conversion of distillate range feedstock.

U.S. Pat. Nos. 4,689,138; 4,859,311; 4,921,594; and 5,149,421, the disclosures of which are incorporated herein by reference, teach silicoaluminophosphate molecular sieves for isomerizing waxy hydrocarbon components.

The present invention is directed to a process for dewaxing a specific type of oil, which contains wax having a low proportion of normal alkanes. Dewaxing oils of this type requires a highly selective catalyst in order to maintain a high yield of lubricating oil base stock product. The present invention provides such a catalyst. A medium pore aluminosilicate zeolite, SSZ-32, is the catalyst used in the present process. SSZ-32 has been shown in co-assigned U.S. Pat. No. 5,053,373, issued Oct. 1, 1991 to S. I. Zones, to dewax hydrocarbon feeds by selectively removing straight chain paraffins. Feeds to the dewaxing process include light gas oil, heavy gas oils and reduced crudes boiling above 350° F. (about 177° C.). The SSZ-32 hydrodewaxing catalyst of '373 may optionally contain a hydrogenation metal. The present process is particularly directed to heavy refinery streams containing a high proportion of non-normal paraffin waxes, and to the process for reducing the pour point of these streams at high selectivity and at high yield.

SUMMARY OF THE INVENTION

In accordance therefore with the present invention, a process is set forth for converting a high boiling, high pour point oil to a relatively lower pour point oil. More particularly, a process is provided for producing a lubricating oil base stock from a heavy wax-containing oil, said process comprising contacting said heavy oil under mild cracking and isomerization conditions with a catalyst comprising (a) a zeolite having a mole ratio of silicon oxide to aluminum oxide greater than about 20:1 to less than 40:1, and having the X-ray diffraction lines of Table 1; and (b) at least one Group VIII metal, wherein said wax is a naphthenic wax, and wherein the pour point of said lubricating oil base stock is reduced relative to the pour point of said heavy oil.

As used herein, naphthenic wax is wax containing a substantial portion of naphthenic wax components, ie. wax components which are not normal alkanes.

Among other factors, the present invention is based on our discovery that SSZ-32 selectively isomerizes small amounts of normal paraffins in the presence of high concentrations of waxlike non-normal paraffins. This property of SSZ-32 provides a highly selective process for lowering tile pour point of heavy feeds which contain naphthenic wax at high yield of lubricating oil base stock.

DETAILED DESCRIPTION OF THE INVENTION

In the present process, a heavy oil containing naphthenic wax is converted under mild cracking and isomerization conditions to a low pour point oil. Oils which contain a high wax content, up to and including essentially pure wax, and oils containing a minor amount of wax may both be treated in the present process. As used herein, naphthenic wax is contrasted from paraffin wax in that naphthenic wax is a petroleum derived wax containing a substantial amount of hydrocarbons other than normal alkanes. In general, naphthenic waxes are composed of $C_{30}$ and larger hydrocarbon molecules. Less than about 50 weight percent, preferably less than about 40 weight percent, and more preferably less than 35 weight percent of the molecules are normal alkanes (ie. normal paraffins), the remainder being largely isoparaffins, noncondensed cycloparaffins and condensed cycloparaffins. There may also be small amounts of benzenes and naphthalenes. Each or all of these may have normal paraffin substituent groups to increase the waxlike character of the particular molecular species.

When determining the composition of the naphthenic wax, it is frequently necessary to separate the wax from oil containing the wax or contained in the wax. Methods are available in the art for both removing a major amount of oil from a minor amount of wax, and for removing a minor amount of oil from a major amount of wax. The oil content of the naphthenic waxes may be determined, for example, using method ASTM D721.

There are a number of methods known in the art for quantifying the normal alkane content of a naphthenic wax, including gas chromatographic methods, and mass spectroscopic methods. It is preferred that the naphthenic wax to be analyzed for normal alkanes contain no more than about 25 weight percent oil, and more preferably no more than about 15 weight percent, most preferably no more than about 5 weight percent oil.

Examples of feeds which may be treated in the present process include, for example, crude oils, reduced crude oils, gas oils, lubricating oil stocks, foots oils, slack wax, deoiled waxes, waxy bright stock and microcrystalline wax. The total wax content of the oil, including normal alkane and naphthenic waxes, depends on the crude from which it is produced. Oil having a total wax content ranging from about 0.5 weight percent to 100 weight percent can be dewaxed in the present process. The benefit of the present process increases with wax content. Thus, oils containing greater than 5 weight percent total wax are preferred, and oils containing greater than 10 weight percent total wax are particularly preferred. The oil will have a pour point of at least 0° C., preferably at least 10° C., and more preferably at least 20° C. Typically, at least 80 volume percent of the heavy oil will boil at a temperature greater than about 800° F. (about 427° C.), preferably greater than about 850° F. (about 454° C).

Heavy gas oil boiling in the range of about 800° F. to about 1050° F. (about 427° C.–566° C.) is a specific example of a heavy oil which can be treated using the present process. Bright stock is another specific example. Bright stock is a deasphalted residuum fraction from a crude distillation column. The deasphalted residuum used to prepare the waxy bright stock has a normal boiling range on the order of from about 900° F. to about 1300° F. (about 482° C.–704° C.), and preferably in the range from about 1000° F. to about 1250° F. (about 530° C.–677° C.).

Before being treated according to the present process, the hydrocarbon feed may be treated in one or more prior treating steps, including hydrotreating, hydrocracking, solvent refining or deasphalting. These pretreatment processes may remove sulfur, oxygen and nitrogen heteroatoms from the feed and increase the viscosity index of the feed. The nitrogen content of the heavy oil depends on a number of factors, including the source of the oil, the boiling range of the oil, and the processing steps encountered by the oil before being treated in the present process. In the present process the nitrogen content of the heavy oil will be generally less than about 100 ppm, though it is preferred to maintain the nitrogen level below about 50 ppm, and more preferred below about 10 ppm, where ppm represents parts per million parts by weight.

As stated above, heavy oils containing a major amount of wax may also be treated in the present process. These highly waxy oils include oils containing greater than about 50 weight percent total wax. Oils consisting of up to 100% wax may be treated in the present process.

Slack wax from heavy gas oil and heavy microcrystalline wax are two specific examples of naphthenic wax which can be treated in the present process. Slack wax is recovered from heavy gas oil by methods known to the art such as, for example, by solvent dewaxing. Heavy microcrystalline wax is generally differentiated from paraffin wax by the size of the wax crystals in the solid wax mass, by the difficulty of separating microcrystalline wax from the oil liquid in which it is found, and by certain characteristic physical properties, including refractive index, melting point and molecular weight. Heavy microcrystalline wax is largely composed of $C_{40}$ and larger hydrocarbons, with less than 10% $C_{39}$ and smaller hydrocarbons. In general, a heavy microcrystalline wax has a refractive index greater than 1.434 measured at 98.9° C. and a melting point of greater than about 145° C. Chapters 1 and 2 of H. Bennett, *Industrial Waxes*, Volume I, Chemical Publishing Company, Inc., 1975, and Kirk-Othmer: Encyclopedia of Chemical Technology, John Wiley and Sons, Third Edition, Vol. 24, p. 473–476 includes a description of microcrystalline waxes.

The present process is contrasted from conventional processes for dewaxing heavy oil by the high yield of high viscosity index lubricating oil base stock having the same boiling range as that of the feed. However, the present process is not to be limited to products boiling in the same range as the feed. Depending on process conditions and the type of feed processed, lubricating oil base stocks having boiling ranges well below that of the feed may be produced, including base stocks boiling at or below 650° F. The lubricating oil base stock which is the product of the present process has a pour point below that of the heavy oil feed. Preferably, the lubricating oil base stock has a pour point of less than about −10° C. Ultra-low pour points of less than −25° C. are also possible with the present process. The present process is particularly suited to the preparation of high viscosity index base stocks. Thus, when heavy waxy oils are treated in the present process, the viscosity index of the base stock product will generally be greater than 95. When the waxy oil is essentially pure wax, or an oil containing high percentages of wax, the viscosity index of the base stock product may be greater than 115, and, depending on the type of oil treated, may be as high as 140 and above.

SSZ-32

The zeolite useful in the present process is termed SSZ-32. Novel SSZ-32 zeolites, as synthesized, have a crystalline structure whose X-ray powder diffraction pattern shows the following characteristic lines:

TABLE 1

| d/n | Int. $I/I_o$ |
|---|---|
| 11.05 | 26 |
| 10.05 | 10 |
| 7.83 | 17 |
| 4.545 | 71 |
| 4.277 | 71 |
| 3.915 | 100 |
| 3.726 | 98 |

The X-ray powder diffraction patterns were determined by standard techniques. The radiation was the K-alpha/doublet of copper and a scintillation counter spectrometer with a strip-chart pen recorder was used. The peak heights I and the positions, as a function of $2\theta$ where $\theta$ is the Bragg angle, were read from the spectrometer chart. From these measured values, the relative intensities, 100 $I/I_o$, where $I_o$ is the intensity of the strongest line or peak, and d, the interplanar spacing in Angstroms corresponding to the recorded lines, can be calculated. The X-ray diffraction pattern of Table 1 is characteristic of novel SSZ-32 zeolites. The zeolite produced by exchanging the metal or other cations present in the zeolite with various other cations yields substantially the same diffraction pattern although there can be minor shifts in interplanar spacing and minor variations in relative intensity. Minor variations in the diffraction pattern can also result from variations in the organic compound used in the preparation and from variations in the silica-to-alumina mole ratio from sample to sample.

Calcination can also cause minor shifts in the X-ray diffraction pattern. Notwithstanding these minor perturbations, the basic crystal lattice structure remains unchanged.

Methods of preparing SSZ-32 zeolites are disclosed in U.S. Pat. No. 5,053,373, the disclosure of which is incorporated herein by reference.

The synthetic zeolites can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica:alumina mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired.

Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe and Co are particularly preferred. High conversions can be obtained with zeolite SSZ-32 in the hydrogen form.

The hydrogen, ammonium, and metal components can be exchanged into the zeolite. The zeolite can also be impregnated with the metals, or the metals can be physically intimately admixed with the zeolite using standard methods known to the art. And, the metals can be occluded in the crystal lattice by having the desired metals present as ions in the reaction mixture from which the SSZ-32 zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined. Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form the zeolite, the spatial arrangement of the atoms which form the basic crystal lattice of the zeolite remains essentially unchanged. The exchange of cations has little, if any, effect on the zeolite lattice structures.

It is preferred that relatively small crystal size zeolite be utilized in practicing the invention. Preferably, the average crystal size is not greater than about 0.5 microns, more preferably no more than about 0.1 microns and still more preferably not more than about 0.05 microns.

The shape selectivity of SSZ-32 is manifested by Constraint Index values (as defined in J. Catalysis 67, page 218), after calcination and in the hydrogen form, of preferably greater than 12, and more preferably or greater. Determination of Constraint Index is also disclosed in U.S. Pat. No. 4,481,177.

The "constraint index" is determined by passing continuously a mixture of an equal weight of normal hexane and 3-methylpentane over a sample of zeolite at atmospheric pressure according to the following procedure. A zeolite sample is prepared in the form of pellets. The pellets are lightly crushed, and the 20-40 mesh fraction is dried in flowing air at 1000° F. (about 538° C.) for at least 30 minutes. A reactor tube is charged with 0.47 grams of the dried zeolite sample. Helium at 9.4 cc/min is introduced to the catalyst charge, and the charge is heated at 800° F. A 1:1 weight ratio blend of normal hexane and 3-methylpentane is then passed over the zeolite at 8 μl/min. Effluent samples are analyzed by on-line gas chromatography to determine the fraction remaining unchanged for each of the two hydrocarbons.

The "constraint index" is calculated as follows:

$$\text{Constr. Index} = \frac{\log_{10}(\text{fraction of n-hexane remaining})}{\log_{10}(\text{fraction of 3-methylpentane remaining})}$$

The aluminosilicate can be formed into a wide variety of physical shapes. Generally speaking, the zeolite can be in the form of a powder, a granule, or a molded product, such as an extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or dried or partially dried and then extruded. The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic zeolite, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the SSZ-32 zeolites can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The SSZ-32 zeolites can also be composited with other zeolites such as synthetic and natural faujasites (e.g., X and Y), erionites, and mordenites. They can also be composited with purely synthetic zeolites such as those of the ZSM series. The combination of zeolites can also be composited in a porous inorganic matrix.

The SSZ-32 hydrodewaxing catalyst contains a Group VIII hydrogenation component of the type commonly employed in dewaxing catalysts. The hydrogenation component may be selected from one or more metals of Group VIII, including the salts, complexes and solutions containing such metals. The preferred hydrogenation catalyst is at least one of the group of metals, salts and complexes selected from the group consisting of at least one of platinum, palladium, rhodium, iridium and mixtures thereof. Reference to the catalytically active metal or metals is intended to encompass such metal or metals in the elemental state or in some form such as an oxide, sulfide, halide, carboxylate and the like.

The hydrogenation component is present in an effective amount to provide an effective hydrodewaxing catalyst and preferably in the range of from about 0.1 to 5% by weight.

PROCESS CONDITIONS

The conditions under which the isomerization/dewaxing process of the present invention is carried out generally include a temperature which falls within a range from about 392° F. (about 200° C.) to about 887° F. (about 475° C.), preferably from about 482° F. (about 250° C.) to about 842° F. (about 450° C.). The pressure ranges from about to about 3000 psig, preferably from about 200 to about 3000 psig, and more preferably from about 200 to about 2000 psig. The liquid hourly space velocity during contacting is generally from about 0.1 to about 20 $hr^{-1}$, more preferably from about 0.2 to about 10 $hr^{-1}$. The contacting is preferably carried out in the presence of hydrogen. The hydrogen to feed is typically between about 500 and about 30,000 SCF/bbl (standard cubic feet per barrel), preferably about 1,000 to about 20,000 SCF/bbl.

The process of the invention may also be employed in combination with conventional dewaxing processes to achieve a lube oil having particular desired properties. For example, the process of the invention can be used to reduce the pour point of a lube oil to a desired degree. Further reduction of the pour point can then be achieved using a conventional dewaxing process. Under such circumstances, immediately following the isomerization process of the invention, the lube oil may have a pour point greater than about 15° F. Further, the pour point of the lube oil produced by the process of the invention can be reduced by adding pour point depressant compositions thereto.

It is often desirable to use mild hydrogenation referred to as hydrofinishing after dewaxing to produce more stable lubricating oils. Hydrofinishing also can be carried out prior to the dewaxing step. Hydrofinishing is typically conducted at temperatures ranging from about 190° C. to about 340° C., at pressures from about 400 psig to about 3000 psig at space velocities (LHSV) from about 0.1 $hr^{-1}$ to about 20 $hr^{-1}$, and hydrogen recycle rates of from about 400 to about 1500 SCF/bbl. The hydrogenation catalyst employed must be active enough not only to hydrogenate the olefins, diolefins and color bodies within the lube oil fractions, but also to reduce the aromatic content. The hydrofinishing step is to determine the retention times of a known mixture of $C_{20}$ to $C_{40}$ normal paraffins. To make the determination. approximately 5 ml of carbon disulfide is added to a weighed amount of the known mixture in a 2-dram vial. Two microliters of the $CS_2$/known sample are injected into an HP-5711 gas chromatograph, which is operated using the following parameters:

| | |
|---|---|
| Carrier gas - helium | Column - 15 m × 0.32 mm ID |
| Splitter flow - 50 ml/min | fused silica capillary |
| Inlet pressure - 30 psig | coated with DB-1. |
| Make-up gas - nitrogen | Available from J&W |
| Make-up flow - 25 ml/min (@ 8 psig) | Scientific. |
| FID hydrogen - 20 ml/min (@ 16 psig) | Oven Temperature Program - (150° C. initial, 4 min. |
| FID air - 300 ml/min (40 psig) | delay, 4° C./min rate, 270° C. final temp, 26-min final |
| Injector Temperature - 350° C. | temp hold. |

-continued

Detector Temperature - 300° C.

The peaks in the resulting GC trace are correlated with the identity of each of the normal paraffins in the known mixture.

The gas chromatographic analysis is then repeated on a sample of the unknown wax. A weighted amount of the unknown wax is dissolved in 5 ml of $CS_2$ and the solution injected into the gas chromatograph, which is operated using the parameters listed above. The resulting GC trace is analyzed as follows:
  (a) Each peak attributable to each normal paraffin $C_x$ present in the wax is identified.
  (b) The relative area of each normal paraffin peak is determined by standard integration methods. Note beneficial in preparing an acceptably stable lubricating oil.

Suitable hydrogenation catalysts include conventional metallic hydrogenation catalysts, particularly the Group VIII metals such as cobalt, nickel, palladium and platinum. The metals are typically associated with carriers such as bauxite, alumina, silica gel, silica-alumina composites, and crystalline aluminosilicate zeolites. Palladium is a particularly preferred hydrogenation metal. If desired, non-noble Group VIII metals can be used with molybdates. Metal oxides or sulfides can be used. Suitable catalysts are disclosed in U.S. Pat. Nos. 3,852,207; 14 4,157,294; 3,904,513; and 4,673,487.

The invention will be further clarified by the following examples, which are intended to be purely exemplary of the invention.

EXAMPLES

The wax content of the oil set forth in the following Examples was determined as follows: 300 g of oil was diluted 50/50 by volume with a 4:1 mixture of methyl ethyl ketone and toluene which was cooled to −20° C. in a refrigerator. The mixture was filtered through a Coors funnel at −15° C. using Whatman No. 3 filter paper. The wax was removed from the filter and placed in a tarred 2 liter flask. The solvent was removed on a hot plate and the wax weighed.

The normal paraffin analysis of a naphthenic wax set forth in the following Examples was determined using the following gas chromatographic (GC) technique. A baseline test is made that only the portion of the peak directly attributable to the normal paraffin, and excluding the envelope at the base of the peak attributable to other hydrocarbons, is included in this integration.
  (c) The relative area representing the total amount each hydrocarbon $C_n$ (both normal and non normal) in the wax sample is determined from a peak integration from the end of the $C_{n-1}$ normal paraffin peak to the end of the $C_n$ peak. The weight percentage of each normal paraffin in the wax is determined by relating the area of the normal paraffin peak to the total area attributable to each carbon number component in the wax. The normal paraffin content of waxes boiling at temperatures beyond the range of the gas chromatograph were estimated from literature references to waxes having similar physical properties.

EXAMPLE 1

1400 ml of water and 56.5 grams KOH were mixed in a Hastelloy C lined 1-gallon autoclave, which was stirred with an overhead paddle-blade stirrer. 23.3 grams of Reheis F2000 alumina (50 wt % $Al_2O_3$) were added, and the mixture stirred until clear. 62 grams of isobutylamine and 200 millimoles of N,N′ Diisopropylimidazolium hydroxide (1M aqueous solution) were then added. 253 grams of Cabosil M-5 were then added in increments with stirring. After additional 30 minutes of stirring, the pH of the mixture was 13.2–13.3.

The reaction mixture was stirred at 75 RPM and heated to 170° C. for 5 days. After washing and drying the reaction product, the product was analyzed by X-ray diffraction and found to be SSZ-32.

The uncalcined zeolite was bound with alumina as follows: 180 grams of zeolite was blended with 97 grams Catapal alumina in a Baker Perkins mixer. To the mixing powders was added 8.3 g of 70% $HNO_3$ in sufficient water so that the total of water in the zeolite, in the alumina, and with the $HNO_3$ was 269 g. The mixing powders containing the nitric acid was mixed for 30 minutes at a total volatiles content of approximately 45% and was then extruded with a 0.113 in die. The extrudates were dried at 250° F. (about 121° C.) for 8 hours and calcined at 1150° F. (about 621° C.) for 1 hour at 1 SCFH dry air. The extrudates were then subjected to a sequence of 4 $NH_4NO_3$ ion-exchanges in a 1M solution, each for 2 hours at 100° C.

The bound exchanged zeolite was impregnated with 0.325 wt % platinum from platinum tetraaminonitrate as follows: A platinum solution was prepared by combining 6.44 grams $Pt(NH_3)_4(NO_3)_2$ with 337 grams water and 48.2 grams of dilute $NH_4OH$ (1/100 volume dilution of concentration $NH_4OH$ containing 28.5% $NH_3$). A slurry was also prepared by combining 100 grams zeolite (volatiles-free basis) with 1048 grams deionized water and 201 grams of 1/100 diluted $NH_4OH$. The zeolite slurry was contacted with the platinum solution for 24 hours. The zeolite slurry was then filtered, washed by reslurrying twice with a 10/1 weight ration of deionized water, air dried for at 30 minutes, and dried at 250° F. (about 121° C.) for 4 hours in forced air. The zeolite was then calcined at 250° F. (about 121° C.) for 2 hours and then heated at 100° F./hr (about 56° C./hr) to 550° F. (about 288° C.), and held at 550° F. (about 288° C.) for 3 hours in 1 SCFH dry air.

Before testing the catalyst with heavy waxy oil feeds, it was reduced in flowing hydrogen at 400° F. (about 204° C.) and 2300 psig pressure for 4 hours in order to equilibrate activity.

EXAMPLE 2

The SSZ-zeolite of Example 1 was tested with a slack wax having the following properties:

| | |
|---|---|
| Gravity, °API | 21.2 |
| Sulfur, ppm | 30 |
| Nitrogen, ppm | <1 |
| Pour Point, °C. | 63 |
| Cloud Point, °C. | 77 |
| Viscosity, cSt @ 100° C. | 8.473 |
| Oil Content, wt % (ASTM D-721) | 30 |
| Simulated Distillation (ASTM D-2887) | |
| 10% overhead | 886° F. (about 474° C.) |
| 50% overhead | 963° F. (about 517° C.) |
| 90% overhead | 1028° F. (about 553° C.) |
| N-paraffin content of deoiled wax, wt % | 30 |

The reaction conditions and product properties from the reaction test were as follows:

|  | Test Number | |
|---|---|---|
|  | 1 | 2 |
| Reaction Conditions | | |
| Temperature, °F. (°C.) | 670 (354) | 580 (304) |
| WHSV | 0.49 | 0.47 |
| Gas Rate, SCFB | 7070 | 7242 |
| Inlet H$_2$ Pressure, psia | 2242 | 392 |
| Product Properties | | |
| Viscosity, cSt | | |
| (corrected to 500° F. flash point) | | |
| @ 40° C. | 52.92 | 56.50 |
| Viscosity Index | 133 | 132 |
| Pour Point, °C. | −27 | −18 |
| Cloud Point, °C. | −7 | −7 |
| Refractive Index | | |
| @ 20° C. | 1.4666 | 1.4684 |
| Yield, wt % | 63.3 | 68.6 |

EXAMPLE 3

The SSZ-zeolite of Example 1 was tested with a microcrystalline wax having the following properties:

| | |
|---|---|
| Gravity, °API | 32.1 |
| Sulfur, ppm | 6 |
| Nitrogen, ppm | 0.62 |
| Pour Point, °C. | 81 |
| Cloud Point, °C. | |
| Viscosity, cSt @ 100° C. | 21.13 |
| Oil Content, wt % (ASTM D-721) | 6.7 |
| Simulated Distillation (ASTM D-2887) | |
| 10% overhead | 1052° F. (567° C.) |
| 50% overhead | 1160° F. (627° C.) |
| 95% overhead | 1238° F. (670° C.) |
| N-paraffin content (estimated), wt % | 25 |

The reaction conditions and product properties from the reaction test were as follows:

|  | Test Number | |
|---|---|---|
|  | 3 | 4 |
| Reaction Conditions | | |
| Temperature, °F. (°C.) | 680 (360) | 600 (316) |
| WHSV | 0.40 | 0.41 |
| Gas Rate, SCFB | 7953 | 7833 |
| Inlet H$_2$ Pressure, psia | 2272 | 405 |
| Product Properties | | |
| Viscosity, cSt | | |
| (corrected to 500° F. flash point) | | |
| @ 40° C. | 134.1 | 166.6 |
| Viscosity Index | 127 | 120 |
| Pour Point, °C. | −39 | −42 |
| Cloud Point, °C. | −5 | 4 |
| Refractive Index | | |
| @ 20° C. | 1.4655 | 1.4704 |
| Yield, wt % | 25.1 | 31.4 |

EXAMPLE 4

The SSZ-zeolite of Example 1 was tested with a heavy hydrocracked oil having the following properties:

| | |
|---|---|
| Gravity, °API | 29.6 |
| Sulfur, ppm | 10 |
| Nitrogen, ppm | 4.36 |
| Pour Point, °C. | 54 |
| Cloud Point, °C. | 60 |
| Viscosity, cSt @ 70° C. | 25.98 |
| Viscosity, cSt @ 100° C. | 11.05 |
| Wax Content, wt % | 18.0 |
| N-paraffin content of wax, wt % | 29 |
| Simulated Distillation (by ASTM D-2887) | |
| 10% overhead | 866° F. (463° C.) |
| 50% overhead | 953° F. (512° C.) |
| 95% overhead | 1025° F. (552° C.) |

The reaction conditions and product properties from the reaction test were as follows:

|  | Test Number | |
|---|---|---|
|  | 5 | 6 |
| Reaction Conditions | | |
| Temperature, °F. (°C.) | 660 (349) | 700 (371) |
| WHSV | 2.16 | 2.17 |
| Gas Rate, SCFB | 4991 | 4965 |
| Inlet H$_2$ Pressure, psia | 2227 | 2208 |
| Product Properties | | |
| Viscosity, cSt | | |
| (corrected to 500° F. flash point) | | |
| @ 40° C. | 102.5 | 99.72 |
| Viscosity Index | 100 | 98 |
| Pour Point, °C. | −21 | −30 |
| Cloud Point, °C. | −7 | −62 |
| Refractive Index | | |
| @ 20° C. | 1.4781 | 1.4777 |
| Yield, wt % | 89.1 | 86.3 |

The examples above show the high yield and excellent viscosity index possible when dewaxing heavy waxy oils with SSZ-32.

What is claimed is:

1. A process for producing a lubricating oil base stock from a heavy oil, said process comprising contacting said heavy oil under mild cracking and isomerization conditions with a catalyst comprising
   (a) a zeolite having a mole ratio of silicon oxide to aluminum oxide greater than about 20:1 to less than 40:1, and having the X-ray diffraction lines of Table 1; and
   (b) at least one Group VIII metal,
   wherein said heavy oil contains naphthenic wax, and wherein the pour point of said lubricating oil base stock is reduced relative to the pour point of said heavy oil.

2. The process according to claim 1 wherein the heavy oil contains at least 5 weight percent wax.

3. The process according to claim 2 wherein the heavy oil contains at least 10 weight percent wax.

4. The process according to claim 1 wherein the naphthenic wax contains less than about 50 weight percent normal alkanes.

5. The process according to claim 4 wherein the naphthenic wax contains less than about 40 weight percent normal alkanes.

6. The process according to claim 1 wherein at least about 80 volume percent of the heavy oil boils at a temperature greater than about 800° F. at atmospheric pressure.

7. The process according to claim 1 wherein the heavy oil is a heavy gas oil.

8. The process according to claim 1 wherein said heavy oil is a hydrocracked stock.

9. The process according to claim 1 wherein said heavy oil is a solvent refined stock.

10. The process according to claim 1 wherein at least about 80 volume percent of the heavy oil boils at a temperature greater than about 1000° F. at atmospheric pressure.

11. The process according to claim 10 wherein the heavy oil is bright stock.

12. The process according to claim 11 wherein the bright stock contains at least about 5% by weight of wax.

13. The process according to claim 1 wherein said contacting is carried out at a temperature of from about 400° F. to about 850° F., a reaction pressure of from about 15 psig to about 3000 psig and a liquid hourly space velocity from about 0.1 to about 20 hr$^{-1}$.

14. The process according to claim 13 wherein said pressure is from about 100 to about 2500 psig.

15. The process according to claim 13 wherein the liquid hourly space velocity is from about 0.1 to about 5.

16. The process according to claim 1 wherein said contacting is carried out in the presence of between about 400 to about 8000 standard cubic feet of hydrogen per barrel of feedstock.

17. The process according to claim 1 further comprising hydrofinishing the dewaxed lube oil.

18. The process according to claim 17 wherein hydrofinishing is carried out at a temperature of from about 190° C. to about 340° C. and a pressure of from about 400 psig to about 3000 psig.

19. The process according to claim 17 wherein hydrofinishing is carried out in the presence of a metallic hydrogenation catalyst.

20. The process according to claim 1 wherein said heavy oil is one or a mixture of materials selected from the group consisting of crude oils, gas oils, lubricating oil stocks, foots oils, slack waxes, deoiled waxes, waxy bright stock and microcrystalline waxes.

21. The process according to claim 20 wherein the heavy oil contains greater than about 70 weight percent wax.

22. The process according to claim 21 wherein the heavy oil contains greater than about 80 weight percent wax.

23. The process according to claim 21 wherein the wax contains less than about 50 weight percent normal alkanes.

24. The process according to claim 23 wherein the wax contains less than about 40 weight percent normal alkanes.

25. The process according to claim 20 wherein the wax is a slack wax from a heavy gas oil.

26. The process according to claim 20 wherein the wax is a heavy microcrystalline wax from a bright stock.

27. The process according to claim 1 wherein the Group VIII metal is platinum, palladium, or mixtures thereof.

28. The process according to claim 1 wherein the Group VIII metal is present in the range from about 0.1 to about 5% by weight.

29. The process according to claim 1 wherein the zeolite has a crystallite size of less than about 0.5 microns.

30. The process according to claim 1 wherein the zeolite has a constraint index of greater than 12.

* * * * *